United States Patent [19]
Davis

[11] 3,825,391
[45] July 23, 1974

[54] DIE FOR EXTRUSION OF LATTICE STRUCTURES

[76] Inventor: Richard P. Davis, Sanbornton, N.H. 03269

[22] Filed: Feb. 28, 1973

[21] Appl. No.: 336,613

Related U.S. Application Data

[63] Continuation of Ser. No. 115,405, Feb. 16, 1971, abandoned.

[52] U.S. Cl..... 425/362, 425/DIG. 37, 264/DIG. 47
[51] Int. Cl............................................. B29c 15/00
[58] Field of Search .... 264/167, 171, 175, DIG. 47; 425/362, 373

[56] References Cited
UNITED STATES PATENTS

| | | | |
|---|---|---|---|
| 727,214 | 5/1903 | Seeser | 264/175 X |
| 1,603,812 | 10/1926 | Stein | 264/175 X |
| 2,662,246 | 12/1953 | Klugh et al. | 425/335 |
| 2,998,623 | 9/1961 | Lawson et al. | 425/328 |
| 3,216,059 | 11/1965 | Voelskow | 425/147 |
| 3,365,352 | 1/1968 | Van Burleigh et al. | 264/175 X |
| 3,394,431 | 7/1968 | Nalle, Jr. | 425/327 X |
| 3,500,627 | 3/1970 | Kim | 264/DIG. 47 |
| 3,515,778 | 6/1970 | Fields et al. | 425/327 X |
| 3,550,826 | 12/1970 | Salmela | 264/DIG. 47 |

*Primary Examiner*—R. Spencer Annear

[57] ABSTRACT

A die for extruding three dimensional lattice materials utilizing a roll of sawtooth configuration in its longitudinal direction, with grooves disposed in a pattern on the surfaces of the teeth. In one form of the die, the roll mates with a set of stationary teeth which closely engage the surfaces of the roll teeth so that material is extruded only when the grooves come into register with the stationary teeth. The bottom surfaces of the stationary teeth are flat, and are slightly spaced from a cylindrical roll. The resulting extrusion is a continuous solid sheet with an open three dimensional lattice structure on its upper surface. In another form of the die, the roll mates with a lower roll of similar configuration with another pattern of grooves on the surfaces of its teeth. The resulting extrusion is an entirely open three dimensional lattice.

6 Claims, 12 Drawing Figures

Inventor:
Richard P. Davis,
by Thompson Mosz
Attorneys

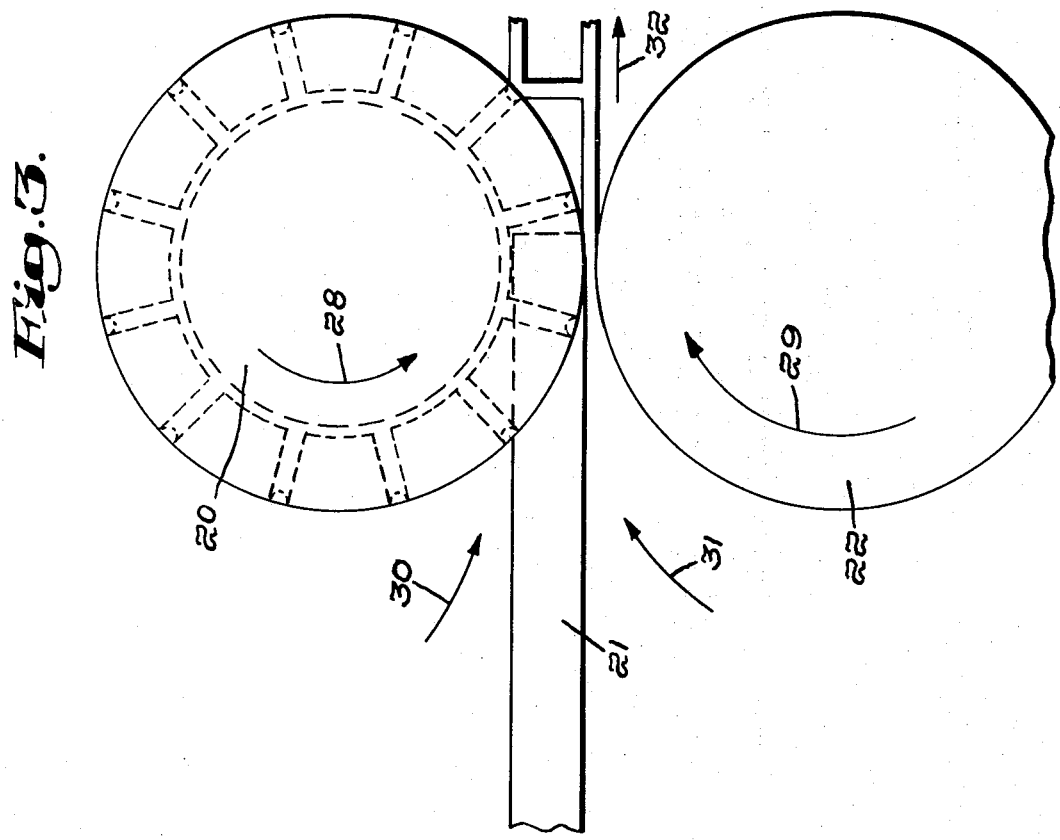

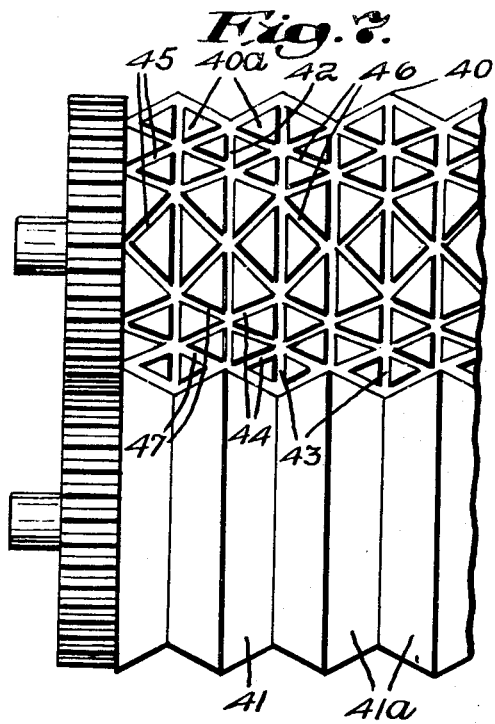
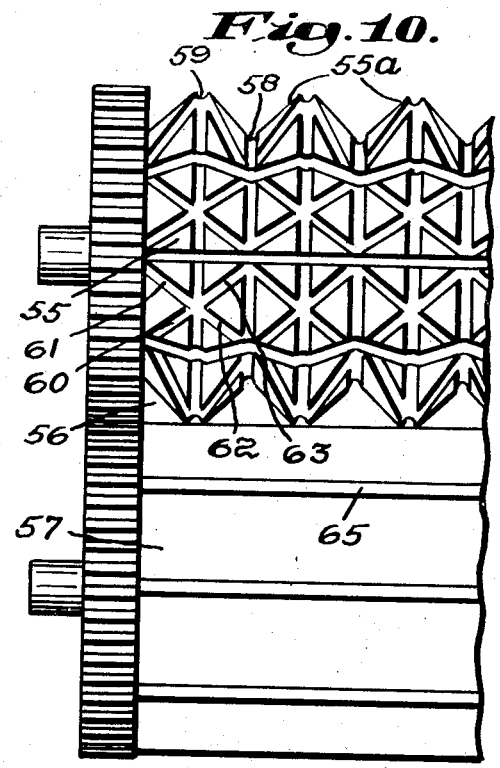
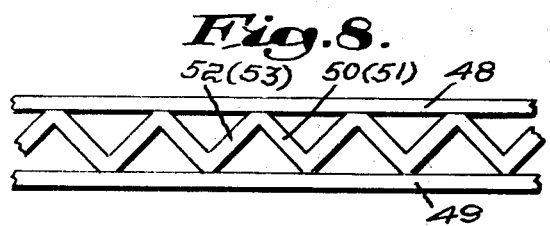
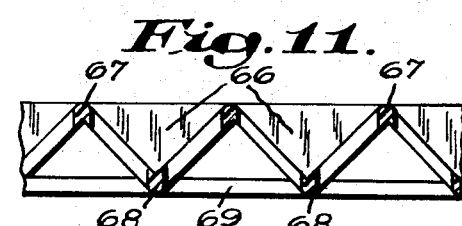
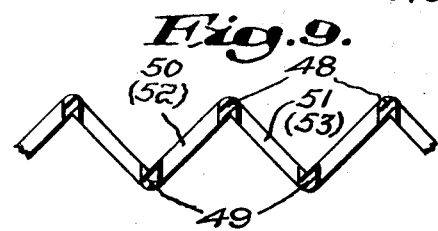
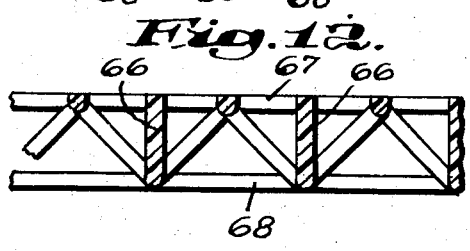

DIE FOR EXTRUSION OF LATTICE STRUCTURES

This invention relates to extrusion dies, and more particularly to a die for extruding lattice materials, the present application being a continuation of my copending application Ser. No. 115,405, filed Feb. 16, 1971, now abandoned.

BACKGROUND OF THE INVENTION

Most dies for extruding lattice or lace structure have parts which are laterally shifted continuously or intermittently to produce an open pattern. Furthermore most of the dies presently used are limited to the production of two dimensional patterns. The principal object of this invention is to provide a die which can produce three dimensional lattice structures readily, in a variety of patterns, and which requires no lateral shifting of the die parts. Other objects, advantages, and novel features will be apparent from the following description.

SUMMARY

The die here described utilizes a roll of sawtooth configuration in its longitudinal direction, with a pattern of grooves on the surfaces of the teeth. In one form of the die, the roll mates with a set of stationary teeth which closely engage the surfaces of the roll teeth so that material is extruded only when the grooves come into register with the stationary teeth. The under sides of the stationary teeth are flat and are slightly spaced from a second, cylindrical roll. The resulting extrusion is a continuous sheet with a three dimensional lattice on its upper surface. In another form of the die, the roll mates with another roll of similar configuration which may have another pattern of grooves on the surfaces of its teeth. The resulting extrusion is an open three dimensional lattice.

DESCRIPTION OF THE DRAWINGS

In the drawings illustrating the invention;

FIG. 3 is a side elevation of the die of FIG. 1;

FIG. 4 is a cross-section taken along line 4 — 4 of FIG. 1;

FIG. 5 is a cross-section of the sheet of material extruded by the die of FIG. 1, taken along line 5 — 5 of FIG. 2;

FIG. 6 is a cross-section of the sheet of material taken along line 6 — 6 of FIG. 2;

FIG. 7 is a fragmentary elevation of a modification of the die;

FIG. 8 is a cross-section of the material produced by the die of FIG. 7, taken along a line transverse to the rolls;

FIG. 9 is a cross-section of the material produced by the die of FIG. 7, taken along a line in the axial direction of the rolls;

FIG. 10 is a fragmentary elevation of another modification of the die;

FIG. 11 is a cross-section of the material produced by the die of FIG. 10, taken along a line in the axial direction of the rolls; and FIG. 12 is a cross-section of the material produced by the die of FIG. 10, taken along a line transverse to the rolls.

DESCRIPTION OF THE PREFERRED EMBODIMENT

Figure 1:
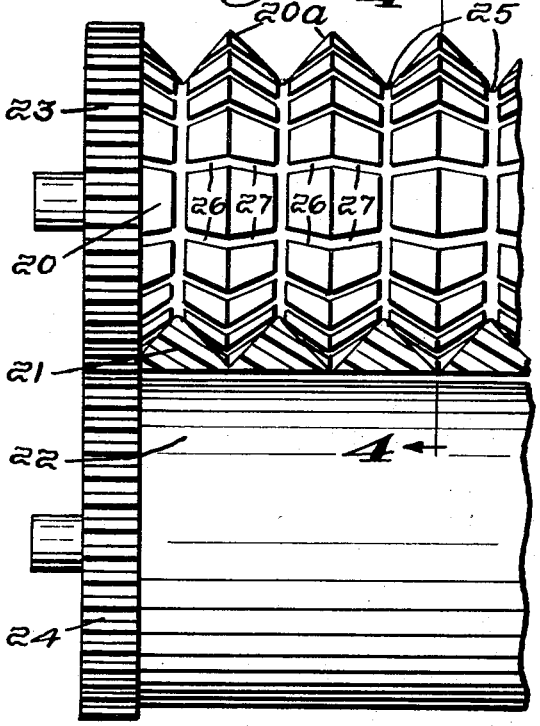
FIG. 1 is a fragmentary elevation of a die constructed according to the invention.
Figure 2:
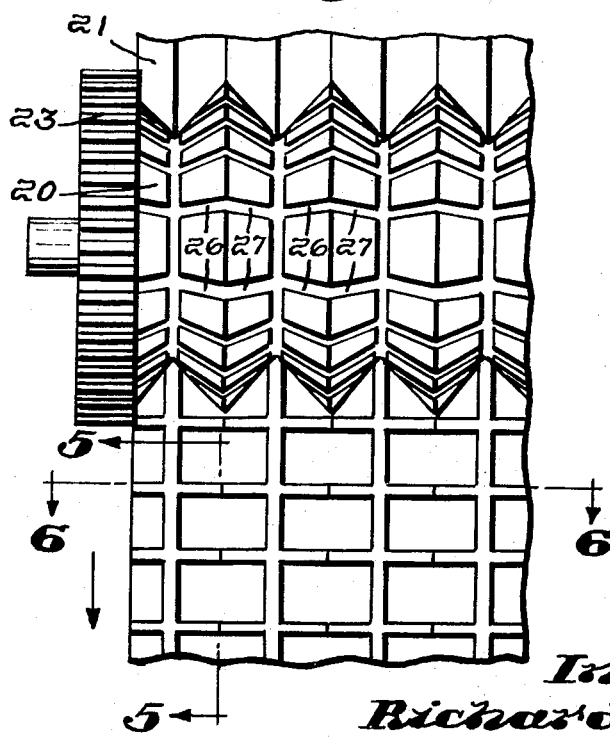
FIG. 2 is a fragmentary plan view of the die of FIG. 1, showing a sheet of material being extruded.

As shown in FIGS. 1 to 4, the die consists of an upper roll 20, of sawtooth profile having teeth 20a, a set of fixed horizontal teeth 21, and a lower, cylindrical roll 22. The rolls have mating flanges 23 and 24 to confine the extruded material at the side. It is understood that the opposite end of the die is similarly constructed, and that the die is provided with suitable means (not shown) for feeding the material to be extruded, such as plastic in liquid form, and heating or cooling the rolls to cure the material as it passes through.

Between the teeth 20a, roll 20 has shallow circumferential grooves 25. A set of shallow grooves 26 extends up the left hand faces of the teeth 20a, and a set of similar grooves extends up the right hand faces. The fixed teeth 21 are in close sliding contact with teeth of the roll 20, so that material can be extruded between them only when the grooves are in register with the fixed teeth. The bases of the fixed teeth are flat and closely adjoin each other to form a substantially continuous wall spaced slightly from the surface of roll 22.

The rolls are driven in the direction of arrows 28 and 29, as shown in FIG. 3, and plastic material is fed into the die in the direction of arrows 30 and 31. The extruded sheet emerges in the direction of arrow 32. The extruded product, as shown in FIGS. 5 and 6, consists of a continuous sheet 33, formed by the bottoms of the fixed teeth and roll 22. With stringers 34, formed by grooves 25, spaced above and running longitudinally of sheet 33, and oblique struts 35 and 36, formed by grooves 26 and 27, respectively, connecting the stringers to sheet 33. The finished material is rigid and light, and, because of its rigidity, automatically separates from the die.

The die shown in FIG. 7 consists of an upper roll 40, of sawtooth profile with teeth 40a, and a lower roll 41, also of sawtooth profile with teeth 41a meshing closely into teeth 40a. Roll 40 has sets of circumferential grooves 42 at the bases of its teeth and 43 along the tops of its teeth. Other sets of grooves 44 and 45 extend obliquely up the left hand sides of teeth 40a, and still other sets 46 and 47 extend obliquely of the right hand faces of teeth 40a. The resulting material, as shown in FIGS. 8 and 9, has staggered upper and lower longitudinal stringers 48 and 49, formed by grooves 42 and 43, respectively, connected together by sets of oblique struts 50, 52 and 51, 53, formed by grooves 44, 45, 46 and 47.

The die shown in FIG. 10 consists of an upper roll 55 of sawtooth profile, with teeth 55a, a set of fixed triangular teeth 56, and a cylindrical lower roll 57. The fixed teeth 56 are in close sliding contact with the teeth of the upper roll and the surface of the lower roll. Roll 55 has shallow circumferential grooves 58 and 59 around the bases and tops of teeth 55a, and sets of shallow oblique grooves 60 and 61, and 62 and 63 extending up the left hand and right hand faces of the teeth respectively. Extending in the axial direction of roll 55 are sets of cuts 64 which go from top to bottom of teeth 55a in the radial direction of the roll. Roll 57 has shallow axially disposed grooves 65.

As shown in FIGS. 11 and 12, the material produced by the die of FIG. 10 has solid triangular wall segments 66 lying transversely and connected together by longitudinal upper and lower stringers 67 and 68. The lower stringers are connected together by transverse stringers 69, and all the parts are interconnected by a network of oblique struts formed by grooves 60, 61, 62, and 63.

It is understood that the groove pattern in the die can be varied to produce a number of different patterns of material.

What is claimed is:

1. A die, for extruding lattice structures, comprising: a turning roll having an axial direction and a sawtooth profile in its axial direction, said roll having spaced circumferential grooves and tooth surfaces between said grooves disposed obliquely with respect to said axial direction; a pattern of grooves traversing said tooth surfaces and intersecting said circumferential grooves; and a member mating with said roll, said member having faces closely engaging said tooth surfaces and blocking extrusion of material between said roll and said member in all regions except said circumferential grooves and said pattern of grooves to produce a structure composed of interconnected strips of material disposed in different planes.

2. A die as described in claim 1, said member comprising a set of stationary teeth of profile to mate with that of said roll.

3. A die as described in claim 1, said member comprising a second roll of profile to mate with said first named roll.

4. A die as described in claim 1, including a second roll having a surface patterned with grooves.

5. A die as described in claim 1, said member comprising a set of stationary teeth of profile to mate with that of said roll, said stationary teeth having flat surfaces disposed away from said roll, and the die including a second, cylindrical roll spaced from said flat surfaces.

6. A die as described in claim 1, said member comprising a set of stationary teeth of profile to mate with that of said roll, said stationary teeth having flat surfaces disposed away from said roll, and the die including a second, cylindrical roll having a surface closely engaging said flat surfaces and patterned with grooves.

* * * * *